United States Patent [19]

Gami et al.

[11] Patent Number: 4,839,754

[45] Date of Patent: Jun. 13, 1989

[54] WINCHESTER DISK DRIVE MOTOR CIRCUITRY

[75] Inventors: Bipin V. Gami, Chatsworth; Ericson Dunstan, Port Hueneme, both of Calif.

[73] Assignee: Micropolis Corporation, Chatsworth, Calif.

[21] Appl. No.: 19,543

[22] Filed: Feb. 26, 1987

[51] Int. Cl.$^4$ .................... G11B 15/46; G11B 19/28
[52] U.S. Cl. .................. 360/73.01; 360/71; 360/74.1; 360/75
[58] Field of Search ................ 318/254, 599; 360/71, 360/73, 74.1, 97, 98

[56] References Cited

U.S. PATENT DOCUMENTS

| | | |
|---|---|---|
| 3,294,902 | 12/1966 | Maxey . |
| 4,040,109 | 8/1977 | Kryltsov ........................ 360/84 X |
| 4,285,016 | 8/1981 | Gilovich .......................... 360/84 |
| 4,318,146 | 3/1982 | Ike et al. ........................ 360/107 |
| 4,321,634 | 3/1982 | Lehureau ........................ 360/70 |
| 4,359,674 | 11/1982 | Gotou ............................ 318/318 |
| 4,369,473 | 1/1983 | Eibensteiner .................. 360/85 |
| 4,482,928 | 11/1984 | Moriya et al. ................. 360/77 |
| 4,527,102 | 7/1985 | Gotou ............................ 318/254 |
| 4,608,524 | 8/1986 | Yokobori ....................... 318/254 |
| 4,609,947 | 9/1986 | Yamagiwa et al. ............ 358/310 |
| 4,622,499 | 11/1986 | Squires et al. ................. 318/254 |
| 4,638,223 | 2/1987 | Tajima et al. .................. 318/254 |
| 4,638,383 | 1/1987 | McGinlay et al. ............. 360/78 X |
| 4,658,308 | 4/1987 | Sander ........................... 360/74.1 |
| 4,712,146 | 12/1987 | Moon et al. .................... 360/97 |
| 4,739,427 | 4/1988 | Kilmer et al. .................. 360/97 |

FOREIGN PATENT DOCUMENTS 52-26807 2/1977 Japan .

OTHER PUBLICATIONS

"New Format Video Recorder", E. W. Pugh, IBM Tech. Disc. Bull., vol. 22, No. 4, Sep. 1979, pp. 1714–1716.

"Dual-Sided Magnetic Recording", H. J. Zentgraf, IBM Tech. Disc. Bull., vol. 15, No. 11, Apr. 1973, p. 3468.

Primary Examiner—John H. Wolff
Attorney, Agent, or Firm—Poms, Smith, Lande & Rose

[57] ABSTRACT

An improved switching regulator power supply with a variable duty cycle is disclosed which forms part of a compact Winchester disk drive system having a storage capacity in excess of 380M bytes of information. The switching regulator is designed for frequencies in excess of 80 kilocycles per second and may therefore be construed using smaller capacitive and inductive elements. Also, very low heat dissipation and high regulator efficiency may be achieved by the improved power supply to drive a brushless D. C. motor encased within a hard disk assembly where no separate fan or cooling system is used to aid in heat removal. Circuitry is provided to control the motor speed while simultaneously limiting the motor current to a predetermined level. This is a achieved by controlling the voltage applied to the motor by suitably adjusting the duty cycle of the switching regulator. A filter is provided to ensure that the switching regulator current fluctuations are not reflected in the current drawn from the power supply. At the start when the D. C. motor E.M.F. is zero, the switching regulator causes significantly higher current to flow through the motor than is drawn from the power supply through a current multiplying effect. These unique features provides significant advantages in a Winchester disk drive using thin film media whose overcoming high level of initial stiction-friction forces is important and desirable.

20 Claims, 4 Drawing Sheets

WINCHESTER DISK DRIVE MOTOR CIRCUITRY

BACKGROUND AND FIELD OF THE INVENTION

1. Field of the Invention

This invention relates to computer disk drives, and more particularly to a computer disk drive system and associated power supply for the drive motor and head positioner circuitry.

2. Background of the Invention

Digital data may be stored on flexible or "floppy" disks or on hard or Winchester-type disks by the magnetization of successive small areas on the magnetic surface of the disk, by means of a magnetic head as the disk rotates. The density of digital storage on hard disk memory systems is on the order of 10 to 20 times the density achieved with floppy disk memory systems.

In the field of hard disk systems, sometimes referred to as Winchester-type disk systems, the rigid disk are normally formed of an aluminum alloy, and have a magnetizable coating on their upper and lower surfaces.

Rigid magnetic storage disks were originally relatively large in diameter, but in the last few years, the size has been reduced to that 5¼ inch disk systems are now widely available. Further, industry standard dimensions have been established for 5¼ inch Winchester-type disk units, and these dimensions include a height of 3.25 inches (82.6 millimeters), a width of 5.75 inches (146 millimeters), and a depth of 8.00 inches (203 millimeters). Environmental standards have also been established, with the operating temperature extending from 5° C. to 50° C. and the non-operating or storage temperature extending from −40° C. to +65° C.

Hard disk drives, especially of the Winchester-type, have continually been improved in design to allow the storage of progressively more data. Recent series disk drives provide in excess of 380M bytes of data in a standard 5¼ inch disk system, where "M bytes" stands for millions of bytes of digitial storage, and each byte contains eight binary digits or bits of data. High performance positioning systems allow average access time of 18 msec (milliseconds). In order to conserve space while allowing more storage room for additional disks, the drive motor has been incorporated into the spindle hub to make more vertical space available for the storage platters.

A preferred motor is a spindle-mounted four-pole delta-wound D.C. brushless motor with an armature resistance of one ohm and a torque constant of 2.6 oz-in/amp. The power dissipation within the drive must be limited to 20 watts while idling and 29 watts while seeking. Due to space considerations and the fact that the motor is mounted inside the spindle hub, this larger capacity disk drive must be capable of operating in an ambient temperature of 50° C. (122° F.), with no provisions for a cooling fan, while keeping the temperature within the drive below 65° C. (149° F.). This is important because the media as well as various electronic components are industry rated not much above 65° C.

In order to run the disk drive within the above-stated parameters, the current drawn from the 12 V power supply will have to be limited. This requires limiting the motor current, for example, to 3 amperes during the start-up of the motor and 2 amperes during normal operation of the disk drive. Also it is desirable to reduce the current ripple in the +12 V line as many power supplies today use switching regulators which do not operate properly in the presence of fluctuating loads. Additionally for the given amount, of average power dissipation within the drive, reducing the current ripple in the power line also reduces the peak power requirement for the power supply.

Power supply methods for Winchester hard disk drives usually envision a linear voltage regulator for speed control. Linear regulators always have substantial power dissipation in the electronics. On motor start-up, even when the mechanical power required is small, the power drawn from the power supply is still very large. High power dissipation in the linear speed regulator results in high electronics temperatures which can not easily be handled where compact design considerations prohibit the use of a cooling fan.

In addition, the linear voltage regulators which have been used heretofore in disk drives, severely limit the initial power supplied to the motor, resulting in low acceleration rates, and consequent relatively long start-up times, before the unit is ready for information storage use.

An additional requirement for any speed control system will be to provide adequate braking and a rapid stop-start transition capability. A high initial torque is required at starts to overcome the "stiction-friction" phenomena which occurs where a magnetic head or slider at rest on a disk surface has high starting friction almost amounting to a "bond" between the head-disk interface. Once the disks are rotating at a moderate speed, the magnetic heads or sliders start "flying" with a thin cushion of air between the heads and the disk surface. At both stops and starts, it would be desirable for an improved winchester-drive to minimize the head-disk contact time. Mechanical braking is not feasible for a Winchester disk drive with the motor mounted inside the spindle hub. The dynamic braking which short circuits the windings via the drive transistors is the best practical way to provide the braking.

One prior art regulator for a variable speed motor, and which is not disclosed as involving disk drives, is U.S. Pat. No. 4,359,674 to Gotou. The Gotou patent shows a bi-polar switch controlling power through a diode, and an inductor and capacitor network, as shown in FIG. 6, box 52 of the U.S. Pat. No. 4,359,674 patent. Switching rates in such a regulator were at a relatively low frequency range. In such a system, the switching method is independent of the speed control and current limit factions. The duty cycle of the switching regulator is controlled so as to minimize the voltage drops across the power transistors to the predetermined small value yet keeping them in the linear operating ragne. It appears that the speed control function has been achieved by controlling them in the linear operating range. It appears that the speed control function has been achieved by controlling the current through the coils X, Y, Z (his FIG. 6) by means of command signal 60 of unspecified origin. Therefore the primary purpose of the switching regulator is to reduce the voltage applied to the motor (vc) to the minimum possible level consistent with still operating the drive transistors in the linear operating range.

Also, it may be noted that the switching regulator current switching by transistor 100 is directly reflected in the power line, so that there are output current pulses from the input DC voltage source, as there is no provision for smoothing these current fluctuations.

Further, with regard to packaging considerations, such prior art switching arrangements required large capacitors and inductors which would not fit within the limited space available in a Winchester disk drive system.

Accordingly, a principal object of the invention is to provide a low heat dissipation power supply which is compact enough to fit within the severely limited space of a Winchester-type disk drive; which will not overheat; and, which will provide maximum power to the motor, accelerating the disks until the heads are flying. Once running speed is obtained lesser levels of power will be provided, so that the power supply draws additional power only as needed.

A prime design objective is a power supply and control system which has high efficiency and minimal power dissipation in any of the electronics, conserving power to accelerate and rotate the disks.

SUMMARY OF THE INVENTION

A specific circuit, illustrating the principles of the inventor, involves a regulated power supply for a hard disk drive system for regulating the operation of the hard disk assembly (HDA). A head positioner assembly, and the D.C. motor which drives the disks are included within the HDA. The regulated power supply comprises a D.C. power supply coupled to a switching regulator circuit. The switching regulator circuitry has a switching duty cycle controlled by a duty cycle controller which pulse-width modulates the operation of a switching transistor within the regulator circuit. The switching regulator circuit delivers a regulated voltage supply to a motor drive circuit which includes a plurality of power MOSFETS (Metal Oxide Semiconductor Field-Effect Transistors) operating in full saturation.

The motor drive circuit is sequentially activated by a motor drive logic circuit to energize selectively each of the coils of a delta wound four-pole brushless D.C. motor in order to achieve the motor torque needed for the motor to achieve 3600 R.P.M.. As the motor drive circuit energizes selected coils of the motor stator, a current sensing resistor provides feedback to the motor duty cycle controller as to the amount of current (and therefore power) drawn by the D.C. motor. Additionally, a tachometer means provides feedback to a motor speed controller as to the actual speed of the motor and compares the measured speed to a pre-set reference speed, the comparison resulting in an error signal being sent by the speed controller to the duty cycle controller.

The motor duty cycle controller uses the feedback information from the speed controller (as to the motor speed) and the current sensed by the sensing resistor to derive a pulse width modulated signal to drive the switching transistor of the regulator circuit in such a manner that the duty cycle may be shifted from a heavy duty cycle, when the motor is started, to a lighter duty cycle when the motor has achieved a steady state speed of 3600 RPM. The current limiting function is performed by a comparator which compares the actual current as sensed by the sensing resistor to the reference value which varies from its maximum valve at the start-up to a smaller valve during the steady state, thus providing a variable set-point reference.

At the initial motor start-up, the speed controller draws the maximum current. The current requested by the speed controller may not exceed a preset limit. Therefore, the current limiting comparator takes over the control of the duly cycle by controlling the input to the duty cycle comparator. As the motor speeds up, the preset current limit is exponentially reduced to a smaller steady state valve after about 8 seconds with the presumption that the speed has reached 3600 RPM. As the speed reaches the 3600 RPM, the speed controller takes over the control of the duty cycle as the current requirement falls below the preset current limit, at steady state. If at any time the speed controller indicates a slower speed than 3600 RPM, the error signal which it transmits the duty cycle controller may cause the motor to draw additional current up to a preset current limit. The duty cycle controller provides proportional plus integral control of the duty cycle of the switching regulator circuit, by stabilizing the output of the speed controller and current limiting comparator so that the drive control signal provided to the duty cycling comparator is a steady D.C. level.

In the preferred embodiment, the switching regulator circuit includes an input low pass filter (inductive and capacitive) and an inductor, capacitor, and Schottky diode allowing the switching transistor to be operated at 100 KHz. The 100 KHz signal is derived in the duty cycle controller by an oscillator means, which is combined with a control voltage to provide a pulse width modulated siygnal to the switching regulator, achieving a current conversion feature not heretofore accomplished in prior art switching regulators.

In addition to switching regulation, dynamic braking is accomplished by the duty cycle controller when the power is turned off. The circuitry provides a two-second delay in the operation of the dynamic braking circuit to allow time for the arm positioner means to retract the magnetic heads into the landing zone away from the recorded information in the data zone. After the two second time delay, the dynamic braking circuit, acting in conjunction with the motor drive logic means, drives the motor coils to ground shorting them out and causing the permanent magnet rotor to stop without the need to pass current across a high impedance resistor as in prior dynamic braking methods.

One aspect of the invention involves the use of a variable set point for the pulse width modulation of a switching type power supply regulator for the motor for a hard disk drive, with the initial or starting maximum current level being relatively high, and being shifted to a lower level once the heads are "flying" and normal running speed is achieved.

In accordance with another aspect of the invention, a closed high storage capacity hard disk drive assembly housing having no cooling fan includes a hub mounted motor and at least five enclosed disks; and the motor is powered by a switching type power supply operating at a frequency in excess of 80,000 Hertz, with correspondingly small inductive and capacitive filter components.

It is further noted that the Winchester disk driver of the present invention have a relatively high storage density. With a volume of about 150 cubic inches and a 380 megabyte storage capacity, the storage density is more than two megabytes per cubic inch. It is further noted that, for the 380 megabyte unit, the cubic volume of the capacitors and inductors of the filter circuitry associated with the high frequency switching type power ACR Calculation supply is less than one cubic inch, or about 0.4 cubic inch. This means that less than one-half of one percent of the unit volume is required for the power supply filter elements.

An important advantage of the present invention as applied to disk drives, is the relatively high initial power supplied to the motor so that high motor accelerations are achieved, and the magnetic heads start "flying" in a very short time period, as compared with prior disk drives using linear regulators, thereby prolonging the life of the interface between the heads and the storage medium. Thus, with a maximum permitted current from the 12 volt power supply, the initial current to the motor at start-up may be two or more times greater, using the switching regulator, thus permitting the high acceleration of the motor and the rapid achievement of head flying speeds. The resultant high initial torque is also advantageous in overcoming starting "stiction-friction" for multiple disk drives.

Other objects, features and advantages of the invention will become apparent from a consideration of the following detailed description, and from the accompanying drawings.

DETAILED DESCRIPTION OF THE PREFERRED EMBODIMENT

Figure 1:
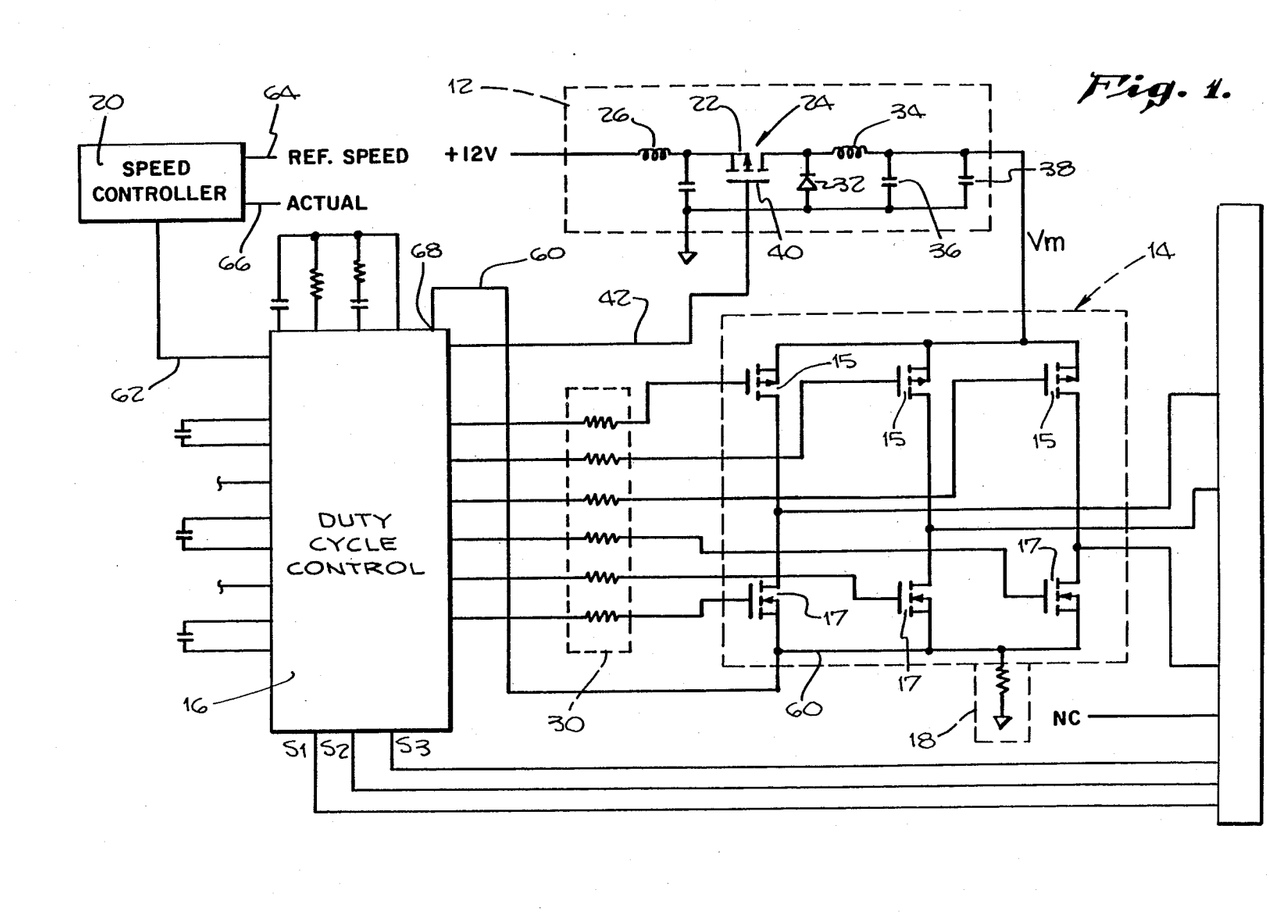
FIG. 1 is a schematic diagram of the Winchester disk drive power supply system of this invention.
Figures 5, 9:
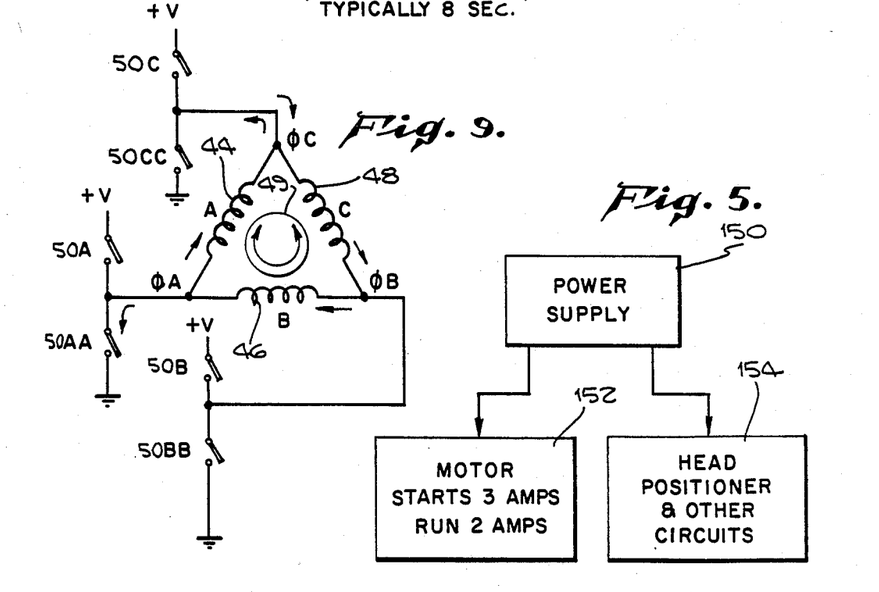
FIG. 5 is a block diagram of the power supply system of this invention.
FIG. 9 is an electrical schematic which shows the operation of the brushless D.C. motor of this invention.

With reference to FIG. 1, a closed loop power supply system is generally shown wherein regulator circuitry 12 produces an output regulated voltage (Vm) to the motor power MOSFET drive circuit 14 which, in turn, drives the motor to full speed, using the brushless D.C. motor of the preferred embodiment (See FIG. 9). The MOSFET drive circuit comprises three P-channel (15) and three N-channel (17) enhancement mode transistors.

Proportional plus integral control of the system is provided by the motor duty cycle controller 16. (A detailed description of the operation of the duty cycle controller 16 is provided with reference to FIG. 2, discussed hereinafter.) In summary, the duty cycle controller 16 receives feedback from a current sensing circuit 18 and a speed controller circuit 20 in order to set the duty cycle of the regulator 12. Setting the duty cycle of the regulator 12 allows the control and stabilization of the regulated voltage (Vm) supplied to the MOSFET drive circuits 14, which also controls the motor current and speed. For purposes of operational illustration, the D.C. motor subject to the control of the closed loop power supply system of FIG. 1 is schematically shown a 4-pole delta wound brushless motor with a permanent magnet rotor 49 (see FIG. 9). (In the preferred embodiment, the rotor 180 surrounds the stator 182 (FIG. 7) and the stator of the motor is encircled by the permanent magnet rotor and has switchable logic controlled windings.)

As discussed in the "Background of the Invention", a conventional dissipative linear power regulator would give rise to unwanted heat and lack the efficiency required for the particular needs of a Winchester Disk Drive System. The selected regulator 12 is a switching type regulator. A D.C. voltage is applied to the source 22 of a P-channel power MOSFET switching transistor 24 through the low filter network comprising inductor 26 and capacitor 28.

A switching regulator comprising power MOSFET switching transistor 24, Schottky diode 32, inductor 34, and capacitor 36 provides a regulated voltage (Vm) to the MOSFET drive circuit 14. The capacitor 38 operates to filter RF (radio frequency) noise generated by the switching regulator. Essentially, switching transistor 24 operates in response to the fixed frequency pulse width modulated signal from the circuit 16 applied to its gate 40, the signal being transmitted to the transistor 24 along conductive pathway 42. In the preferred embodiment, the switching regulator operates at 100 KHz. Circuitry within the duty cycle controller 16 (which will be described with reference to FIG. 2) varies the duty cycle within each fixed full cycle in response to the motor current and motor speed feed back. The duty cycle modulated signal has a fixed period of 10 microseconds, the time for one full cycle of the signal controlling gate 40. However, the time that the signal is "on" and the time that the signal is "off" within each cycle varies over the 10 micro-second range from cycle to cycle. When more current is needed to operate the motor, as in the start up, the duty cycle will be varied to provide greater "on" time each cycle.

Regulation of the voltage Vm is achieved by the regulator means 12 as the switching transistor 24 is rapidly turned "on" and "off" through its gate 40. When the switching transistor 24 is turned "on," current is allowed to flow from capacitor 28 through to the inductor 34. As the current through inductor 34 is allowed to increase, it is supplying current to the capacitor 36 and the inductive load (brushless DC motor, not shown) through the drive circuit 14.

When the duty cycle controller 16 turns "off" the signal to gate 40 of switching transistor 24, further increase of current to inductor 34 ceases. Schottky diode 32 now conducts the stored inductor 34 current, allowing the output voltage Vm to increase until the load current through the motor is greater than current through inductor 34. At this point, the capacitor 36 begins to discharge, and supplies current (RF filtered by capacitor 38) to the load (motor) until Vm drops below a pre-determined reference voltage set within the duty cycle controller 16, wherein the process is repeated. If the switch 24 were ideal, no power loss would occur through the regulator circuit 23, but only in the inductive load (motor).

Figure 2:
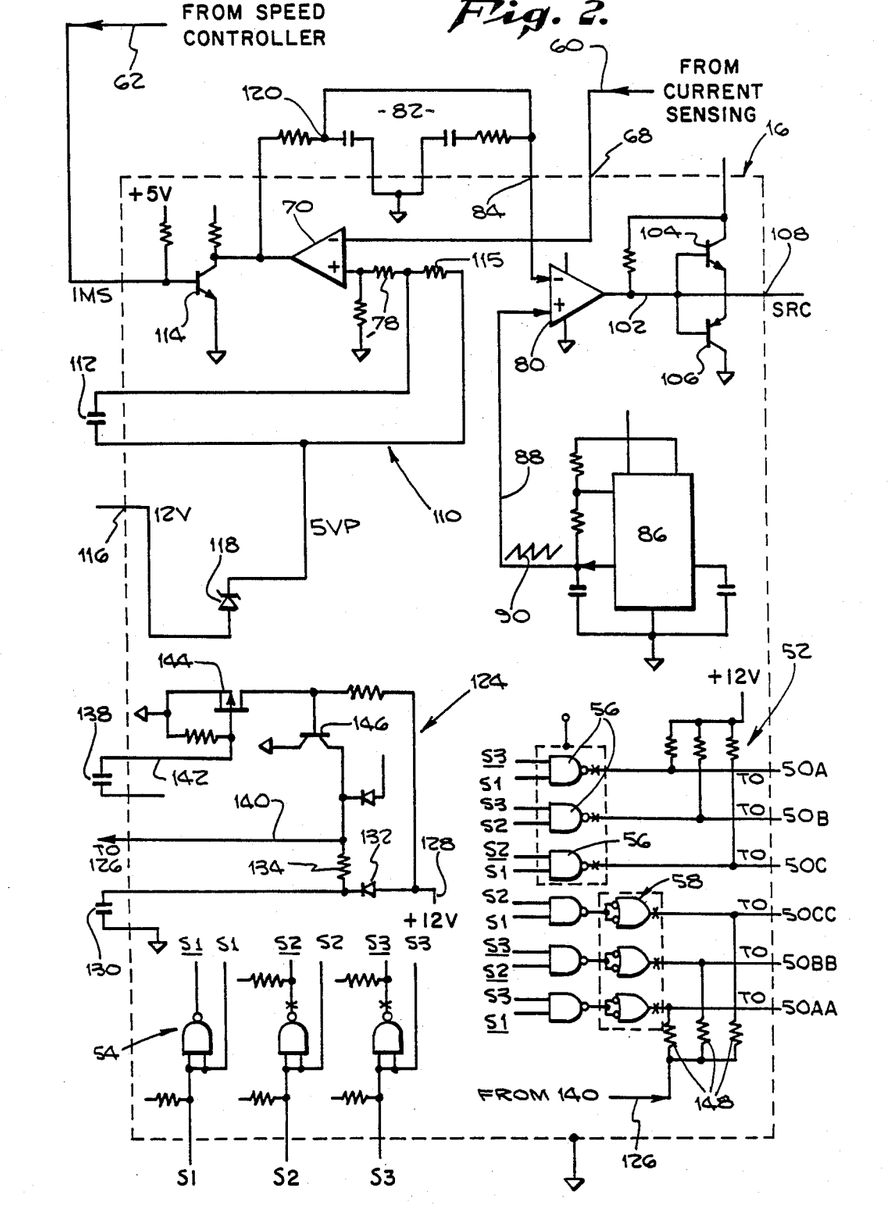
FIG. 2 is a detailed schematic diagram of the duty cycle controller 16.

As it is, efficiency of the switching regulator means 12 is significantly higher than linear dissipative power supply means. The faster the switching frequency (here 100 KHz), the smaller the inductor 34 and capacitor 36 need be. Essentially, when the switch 24 is "on," current flows through the inductor 34 and drives the inductive load (motor) through the drive circuits 14, with very little power dissipation in the inductor 34. Likewise, capacitor 36 and diode 32 operate to minimize power dissipation, so that power losses are primarily in the inductive load motor. In this manner, low $I^2R$ or "copper" losses in the regulator means 12 itself translate to enhanced efficiency and low heat dissipation in the regulator. In addition to the configuraton shown in prior art switching regulators, current conversion is achieved by the presence of the low pass filter comprising inductor 26 and capacitor 28. At high frequencies, the capacitor 28 passes unwanted harmonics from switching transistor 24 to ground so that the 12 V+ power supply coming into regulator means 12 does not get back ripple from the action of switching transistor 24. Current conversion, where a higher amperage output may be derived from a low amperage input, is the result of this unique configuration for the regulator means 12. What is significant in the subject invention is the selection of components for the regulator means 12 which enhance and respond to the rapid switching of transistor 24 rather than fighting rapid current and voltage changes. In particular, the choice of a power MOSFET for switching transistor 24 is important, because power MOSFETS, unlike bipolar transistors, do not hog current nor participate in thermal runaway. There is less need, or concern for available drive, since power MOSFETS exhibit high input impedance. Once the regulated voltage (Vm) is produced at the output of the regulator means 12, this voltage is selectively delivered in an orderly sequence to the MOSFET drive circuit 14. As shown in FIG. 1, sequential activated switches drive the various switches of the delta-wound motor stator, a schematic of which is shown in FIG. 9. In order to drive a permanent magnet rotor of a DC motor, the coils 44, 46, and 48 have to be sequentially activated and then discharged by operation of the drive switches 50A, 50B, 50C, 50AA, 50BB, and 50CC. (See also FIG. 9). Generally, over a fixed period, the switches 50A, 50CC, 50B, 50AA, 50C and 50BB are sequentially triggered to charge and then discharge coils 44, 46, and 48 in order; thus, driving a permanent magnet rotor around the coils. Affixed to the rotor drive shaft (not shown) is typically a plate or cam which houses three separate Hall effect detectors, developing signals S1, S2, and S3. As the detectors detect a changing magnetic field in each coil 44, 46, and 48, froma forward current to the discharge of back EMF, positional information is provided the motor duty cycle controller 16 at $S_1$, $S_2$, and $S_3$, respectively. In this manner, the duty cycle controller 16 can determine motor cycle phase information and activate an internal communication logic circuit 52 (FIG. 2). Working in conjunction with detector gating network 54, sequencing of the following switches is accomplished by the following dot product logic combinations of signals from the detectors (S1, S2, and S3) (where e.g. S1 means inverted S1):

S1·S̄3 Activates switch 50A;
S2·S̄3 Activates switch 50B;
S̄1·S2 Activates switch 50C;
S̄1·S3 Activates switch 50AA;
S̄2·S3 Activates switch 50BB; and
S1·S̄2 Activates switch 50CC.

Inputs $S_1$, $S_2$ and $S_3$ are each connected to a two-input NAND gate of network 54 where S̄1, S̄2, and S̄3, inverted signals, are developed at the output of each tied input NAND gate of network 54.

Six separate NAND gates 56 of commutation logic circuits 52 provide hard-wired logic to derive the aforementioned dot product logic combinations for sequentially driving circuit 14. In turn, negatively enabled by "OR" gates 58 (each "OR" gate being the functional equivalent of an invertor, each have inputs tied, so the output pulses which drive transistors 50CC, 50BB and 50AA are logic "high" for triggering these transistors).

Connected along conductive pathway 60 is the current sensing means 18, which in the preferred embodiment is a sensing resistor for sensing the amount of current present in the current sensing means 18. This low impedance sensing resistor provides real-time information to the motor duty cycle controller 16 as to the amount of current passing through the motor stator coils 44, 46, and 48. In addition to the coil current sensing means 18 providing information to the duty cycle controller 16, the speed controller 20, provides an error signal along conductive pathway 62, which indicates to the controller 16 whether the motor is operating at the desired speed (set by reference positioner 64 and compared to the actual speed indicator 66). In the preferred embodiment, actual speed 66 may be counted in a digital component line 20, where the reference speed 64 may be set by a crystal controller clock. In the manner as herein before discussed, a closed loop feed back system having proportional plus integral control for loop stabilization is disclosed which provide a steady regulated power supply to the brushless DC motor. The closed loop system disclosed includes a regulator means 12 which delivers a regulated voltage (Vm) to the MOSFET drive circuit 14, which in turn ae sequentially activated by the operation of the commutation logic circuit 52. As the drive circuit 14 energizes the coils of the motor, feed back is provided via the current sensing means 18 to controller 16 as to the amount of current drawn by the motor during start-up and steady state operation. Additionally, speed controller means 20 provides accurate motor speed data to the duty cycle controller 16; and, the Hall effect detectors signals S1, S2, and S3 provide sensing for sequencing the motor coil drive. Additionally, the Hall detectors may be used initially to determine actual speed for input through speed indicator 66. After initial acceleration, the steady state speed of 3600 RPM is monitored by means of information derived from optically or magnetically viewing the disk servo-surface. These parameters, speed and coil current, provide input to the duty cycle controller 16. While the speed controller 20 has not been designated in any particular configuration, it may also be an analog comparator device which compares a set voltage representative of desired motor speed with an actual measured speed. Alternatively, a digital sensing circuit may be used to determine speed by counting disk revolutions and digital counter may store the pulse rate within the controller 20 for comparison to the set speed 66 derived from a crystal-controller. In any even, controller 20 derives an error signal which is transmitted along conductive pathway 62 to the duty cycle controller.

An additional feature of the preferred embodiment of the applicant's invention is, in addition to being a switching regulator rather than a dissipative regulator, the motor duty cycle controller 16 provides a proportional plus integral control of the system as opposed to the proportional control provided by the prior systems. In this manner, a system which provides an underdamped response to change will more quickly and accurately change as required by the changes in reference settings and operational modes. The proportional plus integral response of the system and controller 16 of this invention is not only more efficient than a dissipative regulated power supply, but is more responsive to change such as the quick stop and starts, as well as accelerations, encountered in a 3600 RPM disk drive. It is well known in the arts that motor drive circuits inherently result in a steady state error. As discussed in the "Background of the Invention", proportional control envisions a dissipative control of the voltage as a means of controlling motor speed. More voltage (Vm) leads to greater speed. The speed is then monitored and compared to a reference. The reference speed does not accurately reflect true output speed due to the presence of steady state error in the form motor friction and load torque, as well as internal voltage drop across the inherent power supply resistance. This invention provides feedback loop stabilization by disclosing a controller which takes into account reference set desired speed and voltage and combines this information with the steady state error as integrated through a proportional plus integral system. The subject invention provides an output voltage from the duty cycle controller 16 where the sum of the steady state error and the controller output remains constant, so that the steady state error is taken into account by the system and added to the output, so that after a transition period, the sum of the error plus the output voltage will equal the output voltage as the error signal approaches zero. In this manner, the duty cycle controller 16 provides circuit control which reflects the existence of a steady state error which diminishes over a transitional time period.

Duty cycle controller 16 operates to control the duty cycle of the signal to the gate of P-channel MOSFET switching transistor 24. The proportional plus integral control compensates for system lag by smoothly adjusting rapid transitions for stopping and starting of the hard disk drive motor and quickly speeding up the disks, stopping them, and reversing their direction, if necessary. Essentially, the overall control system shown in FIG. 1 is useful in shifting large current load changes, between from 3 to 2 amps, where significant changes in system set point are required. The controller 16 allows rapid response to system changes, such as load start-up and stopping, but under circumstances controlled to avoid system instability.

Figure 3:
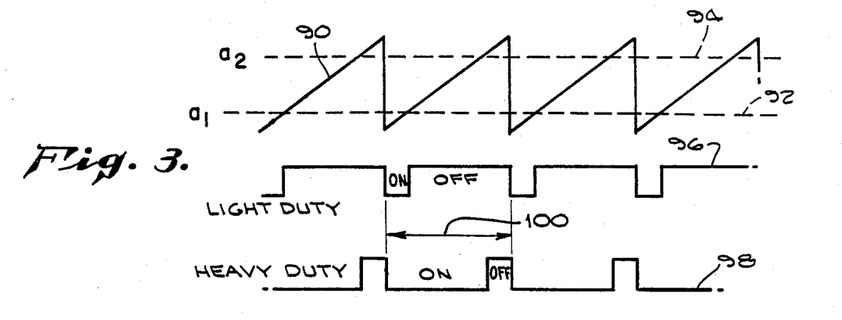
FIG. 3 is a graphic timing diagram showing the input saw tooth oscillator signal mixed for both heavy and light duty cycle signal output.
Figure 4:
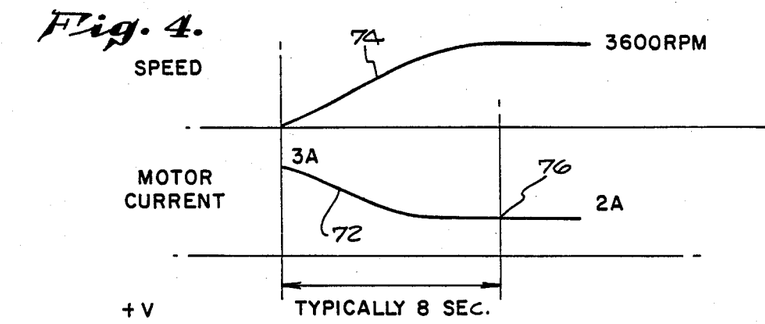
FIG. 4 is a graphic representation of motor speed and motor current against time.

Referring now to FIGS. 2–4, current level is sensed as a voltage level through the VCS pin 68 (voltage controlled current sensing). As will be recalled, current sensing means 18 (FIG. 1) is comprised of a current sensing resistor, rated at 0.1 ohms, for one watt, in the preferred embodiment. Applying the power equation, $P = VI$, for a 3 amp power current, the voltage drop across the current sensing means 18 is 0.3 volts. Likewise, a 0.2 volttage across sensing means 18 is representative of a 2 ampere power current. In this manner, a voltage signal may be applied through VCS pin 68 directly to the inverting terminal of the comparator 70 which corresponds to a particular current level indicating amperage through the DC brushless motor. At the "Start Up" time, the DC motor requires 3 amps current (72) (FIG. 4). As speed increases (74), current is smoothly transitioned by the controller 16 down to 2 amps. The voltage provided through VCS pin 68 by way of sensing means 18 (FIG. 1) is compared at the non-inverting input terminal of comparator 70 with a present reference voltage provided by network 78 to preferably be 0.3 volts. Thus, comparator 70 compares the voltages applied to its respective input terminal, and if the voltage through pin VCS 68 is equal to or less than the 0.3 volt reference applied by network 78, the comparator output remains "high." If, however, the inverting input signal from pin 68 exceeds the non-inverting voltage reference of 0.3 volts, the output of comparator 70 is driven logic "low."

In this manner, comparator 70 senses if the amperage through the motor stator coils exceed start up system limits of 3 amps. If this limit is exceeded, a logic "low" signal is sent out the comparator 70 to comparator 80 via stabilization network 82. Network 82 functions essentially as a low pass filter and acts to provide comparator 80 with a D.C. signal (Vc) and compensate the speed controller 20 and comparator 70 so that ripple or signal flutter is eliminated. Network 82 also provides proportional plus integral control. After being low-pass filtered, the signal output from comparator 70 travels along conductive pathway 84 to the inverting termination of comparator 80. Comparator 80 then combines the control input signal (Vc) from pathway 84 with a 100 KHz (in the preferred embodiment) sawtooth waveform signal produced by the timer 86 (a 555 timer configured for astable operation). The sawtooth signal is conducted along pathway 88 to the non-inverting terminal of comparator 80.

The output and input waveforms for comparator 80 is exhibited and illustrated at FIG. 3. The sawtooth waveform 90 is input to the non-inverting (+) terminal of comparator 80. Voltage levels 94 and 92, respectively, represent the start-up amperage (3 amps) (94) and the steady state current requirements (2 amps) (92). Since the output of comparator 80 is driven "low" to turn on the switch 24, as indicated on the graph of FIG. 3, square wave 98 represents the output waveform of comparator 80 and is the duty cycle for heavy duty operation during "start up". Alternatively, steady state duty cycle 96 is represented by the square wave pulse signal waveform 96 corresponding to the duty cycle during steady state motor run time. Further analysis of the graphic cycle waveforms of FIG. 3 over a typical interval length 100 shows that the "start up" voltage level 94 intersects the sawtooth waveform 90 over a period of time corresponding to the "on" (low) time of heavy duty cycle 98; while, steady state voltage 92 intersects the sawtooth wave 90 for a shorter period of time corresponding to the "on" (low) time of steady state cycle 96. It will be noted that the longer time period of cycle 98 representing heavy duty motor start up of 3 amps is "on" low considerably longer within cycle 100 than the "on" (low) time duty cycle 96 of the steady state 2 amp current. The shapr contrast reflects the fundamental fact that power$= I^2 R;$ i.e. power is proportional to the square of the current. This is why, at the duty cycle controller output, waveforms 96 and 98, must follow the "on" (low) time characteristics of sawtooth wave 90.

It is for this reason that a sawtooth wave is combined with the control voltage (Vc) by comparator 80. The output of comparator 80 is a function of the current limiting effect of the superpositioning of inputs 84 and 88 at the comparator 80. However, square waves like those shown at 96 and 98 of FIG. 3 result because comparator 80 is designed to convert analog signal inputs to a digital signal output. The output from comparator 80 is transmitted along conductive pathway 102 to the directly coupled transistors 104 and 106, which, in turn, buffer the comparator 80 output, providing low impedance signals for transmission to the gate 40 of switching transistor 24 through SRC (switching regulator control) pin 108.

The amplitude of input voltage Vc along pathway is is determined by comparator 70. As previously discussed, comparator 70 provides proportional current control by comparing a reference voltage of 0.3 volts at "start up" at network 78 with a sensed signal from VCS (voltage-current sensing) pin 68. Variable reference control of the current control system of this invention is provided by RC network 110. At initial "start-up", capacitor 112 of the RC network 110 acts as a short circuit, allowing network 78 to impress 0.3 volts at the non-inverting input of the comparator 70. As the capacitor 112 changes up with the passage of time, a voltage of 0.2 volts is imparted to the non-inverting input of comparator 70, down shifting the voltage level, and correspondingly bringing operating current levels to a steady state 2 amps (See FIG. 4, 72 to 76). This shift corresponds to the time constant characteristics of the RC network 110. In this manner, the current sensing signal to the inverting terminal of comparator 70 follows the reference voltage (+) downward, and is effectively compared to the variable reference provided by the action of the capacitor 112 working in conjunction with the resistor 115 of network 110. Variable reference control allows the latching or time-dependent signal-varying of the reference signal to the non-inverting (+) input of comparator 70 to alternate over an 8 second time lag between high current for "start-up" and lower power current for steady state.

In additional to this latching and reference varying function of comparator 70, the motor duty cycle controller 16 provides means for motor speed sensing and accommodating the system to motor speed requirements. As seen by reference to FIG. 2, the output of comparator 70 is tied to the collector of inverter transistor 114. When the speed controller means 20 (FIG. 1) develops a signal over conductive pathway 62 that more current is needed, this signal is imparted to the base of invertor transistor 114, which drives the output of comparator 70 to ground. Thus, when additional current is needed to increase the speed of DC motor, inverter transistor 114 may impart a current request signal to the comparator 70 without regard to its terminal input command signals. Driving comparator 70 causes the signal along pathway 84 to comparator 80 to rise to the start-up voltage, thereby increasing the pulse width of the duty cycle of the regulator means 12. In the foregoing manner, current control may be achieved through voltage sensing through sensing means 18 or speed control through controller means 20. Either control signal can act to drive the output of comparator to "low" and limit current to an acceptable upper amperage.

It will be noted that a 12-volt power supply is used to run the controller 16 and the DC motor system. Referring to pin 116, the 12 volt power is provided (simplified) to a Zener Diode 118. The Zener Diode 118 serves to clamp a regulate voltage of 5.1 volts to the various functional sub-components of controller 16; like, for example, 5.1 volts supplied to RC network 110.

In addition to start-up and steady state operations, the controller 16 provides stopping operations for the DC motor in the form of a dynamic braking circuit 124. The dynamic braking is a system of motor control which takes advantage of the fact that when power to the DC motor stator coils is cut off, a back-EMF develops as the inertial propelled motor rotor acts as a generator. In order to avoid long coasting periods before the motor comes to rest, back EMF is used, in conjunction with dynamic braking circuit 124, to electronically stop the motor without the need to resort to mechanical brakes which are awkward, costly, and not compact or compatible with the hard disk drive design needed as discussed in the Background of the Invention. Dynamic braking is required to prevent damage to the thin film media of the hard disks by the arm positioner heads.

The dynamic braking circuit 124 operates in conjunction with commutation logic circuits 52 via conductive pathway 126 to provide rapid deceleration of the brushless DC motor rotor. During normal power-up operations, either start-up or steady state, the power supply via conductive pathway 128 provides current to charge large capacitor 130 to its limits, the voltage thereby stored in capacitor 130 being clamped up by diode 132 with little or no leakage so long as the 12 volt power at 128 is supplied to the circuit 124. Additionally, large resistor 134 aids in clamping capacitor 130 during operational power up. When the power to the motor and controller is cut off (by a manual other switch not shown), voltages of 12 volts clamped by diode 132 at the capacitor 130 and resistor 134 by diode 136 are removed by the power turn "off," and capacitor 138 is allowed to discharge. Capacitor 138 takes at least 2 seconds to discharge, thus allowing the arm positioner motor time to retract the heads into the positioner arms before the drive motor is stopped by action of the dynamic braking circuit 124. Capacitor 138 has a significantly shorter time constant than capacitor 130; and, resistor 134 acts to slow the discharge of capacitor 130 to prevent a signal from being imparted to conductive pathway 140, before capacitor 138 is discharged. During the discharge of capacitor 138, a drive signal is delivered along conductive pathway 142 to the gate of a P-channel 22 depletion mode (source internally terminated) MOSFET powder switching transistor 144. Once activated, power transistor 144 pulls down hard the base of power transistor 146 (which transistor 146 during power "on," was held in reverse bias at its base—collector junction). This transistor 146, when turned "on" grounds resistor 134 and delays for discharging capacitor 130 through conductive pathway 140. Once discharged, capacitor 138 no longer grounds transistor 146, opening the transistor 146 "switch," and allowing current from capacitor 130 to follow pathway 140 through 126 of commutation control circuit 52, where the current is provided to tied terminals of the drive resistors 148. The drive resistors 148, in turn, activate pathways controlling switches 50AA, 50BB, and 50CC, thereby driving the motor coils 44, 46, and 48 to ground and short-circuiting the motor stator (See FIG. 9). By simultaneously driving all motor coils to ground, a rapid deceleration of the motor rotor results. In this manner, controller 16 also initiates and controls motor braking.

It must be kept in mind that the power supply disclosed herein (See FIG. 5, 150) supplies current to the disk drive motor 152, hereinbefore discussed, and the head positioner 154 and other related circuitry. All of the circuits of the over all disk drive system may benefit from the regulated power derived by the circuits disclosed in the discussion of FIGS. 1–4.

Figures 6, 7, 8:
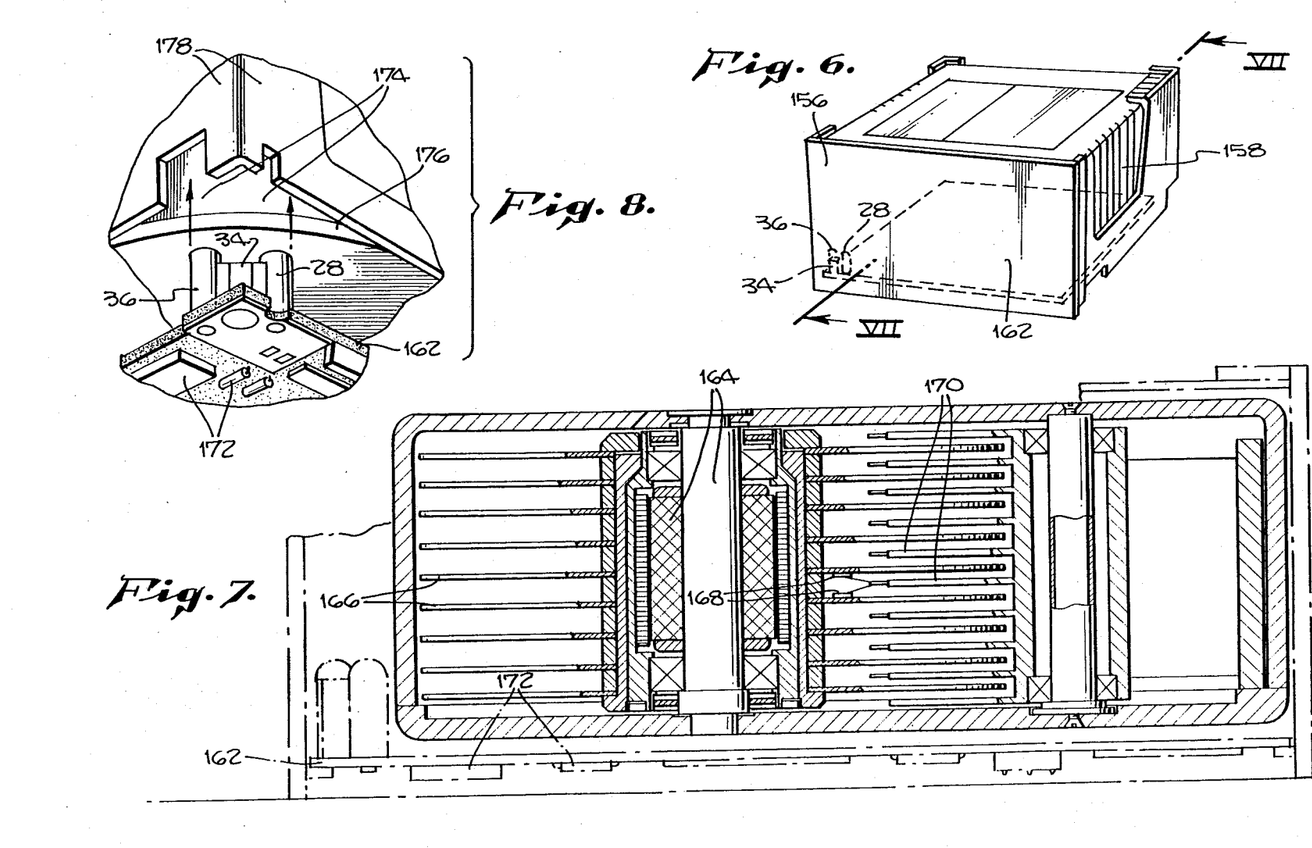
FIG. 6 is a perspective view of the cabient which houses the hard disk assembly.
FIG. 7 is a cross-sectional view of the hard disk assembly taken along line 7—7 of FIG. 6.
FIG. 8 shows a partially exploded view of how certain components of the power supply system are compactly fitted with the cabinet.

Referring now to FIGS. 6–8, it will be seen how the electronic circuitry and system hereinbefore disclosed fits into the tight and compact space and temperature requirements of a high capacity disk drive built according to the present invention.

FIG. 6 shows the cabinet enclosing a disk drive assembly and housing the circuit board according to the present invention. In particular, cabinet 156 needs heat vanes at the perimeter of the cabinet but no internal fan or complex head sink. Most of the upper cabinet space houses the head and disk drive assembly 160 above the circuit board 162 of this invention. A cutaway view of FIG. 6, show at FIG. 7, shows the disk drive assembly 160 housing shaft and motor 164. The disks 160 are integrally affixed to the rotor 180, which surrounds the stator assembly 182. The hard disks 166 surround the shaft and are contacted by heads controlled by the positioner arms. The dynamic braking of the present invention allow these heads 168 to be retracted from the disks 166 before the coil windings 44, 46, and 48 of FIG. 9 are short-circuited. The circuit board 162 is housed below (or alternative above) the head and disk drive assembly 160. The majority of components 172 are housed on the underside of the board, positioned opposite the bottom of the drive assembly 160 and, on the other side of the board 162, adjacent the drive assembly 160, are capacitors 36 and 38 (FIG. B) and inductor 34. Thus, capacitors 36 and 28 and inductor 24 are the only electronic component on the board 162 which fact inwardly into the cabinet space.

A close examination of the disk drive assembly 160 shows that is rectangular within the cabinet 156, but its corners 176 are rounded (FIG. 8), providing a cavity space 174 between the rectilinear or curved edge 176 of the drive assembly 160 and the sharp cornered cabinet walls 178. This cavity space 174, otherwise a dead space, provides a storage area for the two capacitors 36 and 28 and the choke inductor 34.

In this manner, a structurally compact and integral disk drive package is created. It must be appreciated that capacitors 36 and 28, as well as choke inductor 34, would not fit within the cavity space 174 if it were not for the high switching speed of the regulator means 12 which allows reduced sized capacitors 36 and 28 and inductor 39.

While the preferred embodiment of the invention is disclosed herein, the scope of the invention is not necessarily limited to the preferred embodiment. Many schematic changes are possible and these changes are intended to be within the scope of this disclosure. For example, the speed controller 20 could be analog or digital. Likewise, comparators 70 and 80 could be replaced by digital hardware in a manner known in the art to derive a pulse-modulate duty cycle like the output of comparator 80 which affects the switching regulator means 12 in the same manner as the actual output at pin 108. Consequently, the specific configuration of the circuit disclosed herein or the construction of the disk drive system are merely representative, yet are deemed to afford the best embodiment for purposes of disclosure and for proving support for the claims which define the scope of the present invention.

What is claimed is:
1. A hard disk drive system comprising:
a head positioner;
a hard disk drive assembly;
a DC motor, having a fixed stator surrounded by a movable rotor, for driving said disks;
a DC power supply;
a switching regulator means;
means including a series inductor and a shunt capacitor for coupling said switching regulator means to said DC power supply;
motor drive circuit means for driving said DC motor;
said motor drive circuit means receiving a regulated supply of voltage from said switching regulator means;
a motor drive logic means for sequentially activating said motor drive circuit means, said motor drive logic means including motor position sensing means;
a motor speed controller means for establishing an error signal representative of the difference between a desired reference speed and actual motor speed;
a duty cycle controller means for providing pulse width modulated control of said switching regulator means;
a variable set-point current limiting means, including means for varying the set-point to control the current flow to said motor;
said duty cycle controller means including means for providing a stable high frequency duty cycle control signal to said switching regulator means which is a function of (1) said error signal of said motor speed controller means and (2) the output of a variable set-point current limiting means;
current sensing means, connected between said motor drive circuit means, and said variable set-point current limiting means, for sensing the amount of current drawn by said DC motor, and
said current sensing means including means for providing feedback to said current limiting means, to shift the set-point of said duty cycle controller, thereby changing the duty cycle of said switching regulator.

2. A system including a regulated electrical power supply as defined in claim 1, wherein said switching regulator means includes an electronic switch means coupled to an inductor, capacitor, and diode oscillator circuit, and means for operating said switching circuit at a frequency of at least 80 KHz to supply pulses of current from said DC power supply through said inductor, capacitor, and to said diode oscillator circuit.

3. A system as defined in claim 2, wherein said switch means is a MOSFET power transistor.

4. A hard disk drive system as defined in claim 1 further comprising closed housing enclosing the system of claim 1, wherein the low heat dissipation of the unit avoids overheating.

5. A system as defined in claim 1, including a dynamic braking system, operatively associated with said motor drive logic means, said braking system comprising:
a delay circuit means for delaying the operation of said braking system for a limited period to allow retraction of recording heads from the surface of a plurality of disks;
a voltage storage means operative associated with said delay means and connected to the coils of said DC motor stator such that, when the delay provided by said delay circuit has been completed, said voltage storage means connected to said coils operates to short circuit said coils to ground, thereby dynamically braking said rotor and causing said motor to stop with minimum head and disk contact.

6. A hard disk drive system, including a hard disk drive assembly and a head positioner, housing a brushless DC motor, having a rotor and stator drive, which drives a plurality of thin-film media hard disks rapidly up to in excess of 3000 RPM and rapidly down to a braking stop; said hard disk drive system comprising:

a housing containing said hard disk drive assembly;

a power supply having a predetermined output voltage and a limited output current for providing power to said system;

a hard disk drive system circuit board mounted adjacent said disk drive assembly on at least one side, said circuit board supporting a power regulating circuit;

said power regulating circuit having a switching regulator means including at least one inducator and two capacitors, said switching regulator being driven by a switching transistor, controlled by a pulse width modulated variable controller;

said system and said regulator means including means for connecting said switching regulator means to said power supply including a series inductor and a shunt capacitor;

said inductor and two capacitors being mounted on said circuit board on the opposite side of said board at one corner of the circuit board;

said housing being generally rectangular in shape; a cavity space being defined between the housing and a rectilinear corner of said hard disk drive assembly;

said inductor and capacitors fitting into said cavity space to optimize the space utilized by the hard disk drive system.

7. The hard disk drive system of claim 6, wherein the hard disks in total housed within said hard disk drive assembly store in excess of 300 megabytes of information.

8. The hard disk drive system of claim 6, wherein said switching transistor is a MOSFET power transistor of the enhancement mode type.

9. The hard disk drive system of claim 6, including a dynamic braking circuit, which braking circuit includes:

a capacitive power storage component for providing power to said head positioner, so that said head positioner may retract a plurality of magnetic heads from interface with the thin-film media hard disks, before the dynamic braking circuit deactivates the D.C. motor stator drive and stops the motor.

10. A high storage capacity Winchester disk drive system comprising:

a closed housing for the Winchester disk drive systems said housing having a predetermined volume;

a hub mounted motor having an outer rotor mounted within said housing;

arm positioner and magnetic head means for contacting a plurality of hard storage disks;

means for providing at least two megabytes of storage per cubic inch of the total volume of said housing, including at least five of said hard storage disks mounted to said rotor to rotate around said motor;

a power supply having a predetermined output voltage and a limited output current for providing power to said disk drive unit;

a variable pulse width switching type power regulator means having a frequency in excess of 80,000 Hertz mounted within said housing for producing variable width pulses and for supplying power to said motor, said power regulator means having relatively small inductive and capacitive filter components compatible with the switching frequency of more than 80,000 Hertz, and said filter components having a volume which is less than one-half of one percent of the volume of said housing; and means including a series inductor and a shunt capacitor for coupling said switching regulator means to said power supply.

11. The high storage, capacity Winchester disk drive system of claim 10, including a dynamic braking means comprising:

means for delaying activation of said dynamic braking circuit for a relatively short time; whereby said arm positioner means may be withdrawn from contact with said storage disks before the braking circuit is activated thereby preventing wearing down and damage to the surfaces of said disks.

12. A hard disk drive system comprising:

a hard disk drive assembly and a head positioner;

a brushless D.C. motor having a rotor and stator, driving the disk assembly;

a regulated power supply for providing electrical power for use by the hard disk drive system;

a switching regulator means for regulating the voltages level supplied to said DC motor, said switching regulator means comprising at least one inductor, one capacitor, a freewheeling diode, and an electronic switching means;

means including a series inductor and a shunt capacitor for coupling said switching regulator means to said power supply;

means for energizing said switching means at frequencies in excess of 80 KHz, and with variable width enabling pulses;

said switching regulating means requiring that said inductor and said capacitor be of substantially small physical dimensions to easily fit into a housing containing said assembly and system, which system operates without a cooling fan;

a motor drive circuit means for driving said DC motor;

said motor drive circuit means receiving a supply of voltage from said switching regulator means;

a motor drive logic means for sequentially activating said motor drive circuit means, said motor drive logic means including motor position sensing means;

a motor speed controller means for establishing an error signal representative of the difference between a desired reference speed and actual motor speed;

a duty cycle controller means for providing pulse width modulated control of said switching regulator means;

a variable means for current limiting in accordance with the signal at a circuit set-point, including means for varying the set-point to control the current flow to said motor;

said duty cycle controller means including means for providing a stable high frequency duty cycle control signal to said switching regulator means which is a function of (1) said error signal of said motor speed controller means and (2) the output of a variable set-point current limiting means;

current sensing means, connected between said motor drive circuit means, and said variable set-point current limiting means, for sensing the amount of current drawn by said DC motor, and said current sensing means including means for providing feedback to said current limiting means, to shift the set-point of said duty cycle controller, thereby changing the duty cycle of said switching regulator means.

13. A high storage capacity Winchester hard disk drive system comprising:

a closed housing for the Winchester disk drive systems said housing having a predetermed volume;

a hard disk drive assembly;

a hub mounted DC motor, having a fixed stator surrounded by an outer movable rotor mounted within said housing for driving said disks;

a DC power supply;

arm positioner and magnetic head means for contacting a plurality of hard storage disks;

means for providing at least two megabytes of storage per cubic inch of the total volume of said housing, including at least five of said hard storge disks mounted to said rotor to rotate around said motor;

a variable pulse width switching type regulator means operatively connected to said DC power supply, by a circuit including a series inductor and a shunt capacitor, said switching type regulator means having a frequency in excess of 80,000 Hertz, and being mounted within said housing for supplying power to said motor, said power supply having relatively small inductive and capacitive filter components compatible with the switching frequency of more than 80,000 Hertz, and said filter components having a volume which is less than one-half of one percent of the volume of said housing, said switching regulator means including at least one inductor, one capacitor, a freewheeling diode and an electronic switching means, said inductor and capacitor being of substantially small physical dimensions to easily fit into said housing, containing said system, which fit into said housing containing said system, which system operates without a cooling fan;

a motor drive circuit means for driving said DC motor;

said motor drive circuit means receiving a supply of voltage from said switching regulator means;

a motor drive logic means for sequentially activating said motor drive circuit means, said motor drive logic means including motor position sensing means;

a motor speed controller means for establishing an error signal representative of the difference betweeen a desired reference speed and actual motor speed;

a duty cycle controller means for providing pulse width modulated control of said switching regulator means;

a variable set-point current limiting means, including means for varying the set-point to control the current flow to said motor;

said duty cycle controller means including means for providing a stable high frequency duty cycle control signal to said switching regulator means which is a function of (1) said error signal of said motor speed controller means and (2) the output of a variable set-point current limiting means;

current sensing means, connected between said motor drive circuit means, and said variable set-point current limiting means, for sensing the amount of current drawn by said DC motor, and said current sensing means including means for providing feedback to said current limiting means, to shift the set-point of said duty cycle controller, thereby changing the duty cycle of said switching regulator.

14. The hard disk drive system of claim 13 wherein said switching type regulator includes a power MOSFET transistor.

15. The hard disk drive system of claim 13 further including a duty cycle controller providing a pulse-width modulation signal to said switching type regulator whereby said switching regulator has a duty cycle which is a function of said pulse width modulated signal.

16. The hard disk drive system of claim 15, further including a motor speed controller, said motor speed controller providing an error signal to said duty cycle controller, said error signal being derived by said motor speed controller responsive to a comparison of actual motor speed to a reference motor speed setting, said error signal acting to stretch said pulse width modulated signal when additional motor speed is required and compress said pulse width modulated signal when less motor speed is required.

17. The hard disk drive system of claim 15 wherein said duty cycle controller includes:

a first comparator means for comparing a variable voltage reference produced at one input terminal of said first comparator with a voltage signal representative of the current through coils of said D.C. motor stator so that a control voltage signal may be derived for controlling the output of a second comparator means;

said second comparator means comparing said control voltage with the output of a sawtooth wave generator, whereby a pulse-width modulated signal to said motor is derived.

18. The hard disk drive system of claim 13, wherein said system includes a housing, and said switching reguator includes an additional inductor and capacitor, and wherein the inductor and capacitor of said switching regulator fit into a cavity space within said housing containing said disk drive assembly and system, said cavity spaced defined to be the space between outer orthogonally intersecting walls of said housing and a curvilinear corner of the perimeter of said disk drive assembly.

19. The hard disk drive system of claim 13, wherein the hard disk drive assembly has hard disk storage capacity in excess of 300M Bytes of information.

20. A Winchester-type hard disk drive digital storage unit comprising:

a hard disk drive assembly including a plurality of hard disks and associated magnetic heads;

a brushless D.C. motor having a stator and a rotor coupled to said disks for rotating said disks;

a power supply having a predetermined output voltage and a limited output current for providing power to said disk drive unit;

a switching type regulator connected to said power supply for supplying power to said brushless D.C. motor;

means for operating said switching type regulator at a frequency in excess of 80 hertz; and the input to said switching regulator from said power supply constituting circuit means including a series connected coil and a shunt capacitor, for supplying power from said capacitor to said switching regulator when said switching regulator is switched to its conducting state;

whereby the maximum possible power is supplied to said motor during start-up, consistent with the maximum current limitations of said power supply; and heat dissipation requirements for said unit are minimized.

* * * * *